March 24, 1970     G. D. OUCHTERLONY     3,501,850

TEACHING METHOD AND APPARATUS

Filed Feb. 20, 1967     6 Sheets-Sheet 3

FIG. 4

INVENTOR
GUY DAVID OUCHTERLONY
By Cushman, Darby & Cushman
ATTORNEYS

March 24, 1970 G. D. OUCHTERLONY 3,501,850
TEACHING METHOD AND APPARATUS

Filed Feb. 20, 1967 6 Sheets-Sheet 4

FIG. 5

INVENTOR
GUY DAVID OUCHTERLONY
By Cushman, Darby & Cushman
ATTORNEYS

FIG. 7

INVENTOR
GUY DAVID OUCHTERLONY
By Cushman, Darby & Cushman
ATTORNEYS

3,501,850
TEACHING METHOD AND APPARATUS
Guy D. Ouchterlony, Toronto, Ontario, Canada, assignor to Alda Instruments Limited, Toronto, Ontario, Canada
Continuation-in-part of application Ser. No. 582,086, Sept. 26, 1966. This application Feb. 20, 1967, Ser. No. 617,120
Int. Cl. G07b 15/02, 15/08
U.S. Cl. 35—6                                                     6 Claims

ABSTRACT OF THE DISCLOSURE

To facilitate the teaching of music on keyboard instruments, several student's keyboards are connected to a single teacher's console. When the students operate their keyboards in accordance with an instruction from the teacher, an immediate collective aural response is obtained together with a display on the teacher's console, visible only to the teacher, of the keys actually struck on the students' keyboards.

---

This application is a continuation-in-part of United States application Ser. No. 582,086, filed Sept. 26, 1966.

This invention relates broadly to an improved method of teaching music.

In particular, there is no widely used mechanical aid for teaching of music. There is a wide-spread interest in music, and any system which will assist in giving students some semblance of individual attention, while at the same time enabling the teaching of relatively large classes, would gain quick acceptance.

The present invention seeks to put to immediate and practical use by students the various facets of what is popularly known as the theory of music and to enable a teacher to make very effective use of class instruction in the use of keyboard instruments.

In one aspect, the present invention provides a method of assisting the teaching of music to a class of students by a teacher, comprising the steps of providing a keyboard to each student, all of said keyboards being associated with a device capable of delivering sustained tones and being associated with a device capable of visually showing the students' response in a manner visible only to the teacher, asking a question of a class, obtaining an immediate collective aural response from the students by means of the tone-producing device, and an individual response from each student, and grading the individual responses as a result of visual observation.

In another aspect, the present invention provides an apparatus for the teaching of music by a teacher to a class of students comprising a control board and a keyboard for each student. The control board consists of signal light arranged in geometric pattern, each signal light being associated with one key on one keyboard; a tone producing device for each key of the student keyboards. Means are also provided whereby corresponding keys on all the student keyboards sound the same tone but each key on each student keyboard lights a separate light on the control panel whereby to show visually on the control panel which key each student has played in response to a problem given by the teacher.

In accordance with some aspects of the present invention, students may be taught music by the use of multiple student keyboards. Any given number of students may be provided each with a keyboard connected to a master tone-producing device such as an organ and an instructor, teacher, or master is also provided with a keyboard which can be connected also to the tone-producing device. The pitch range of the keyboards is optional but it has been found convenient to make the keyboards for students use with forty-four keys, that is, three and one-half octaves. This is the range in the centre of the piano keyboard most commonly used in both practical and theoretical exercises. The teacher is further provided with a control panel which makes it possible to check visually the accuracy and promptness of the students answer to a series of questions.

The students may be taught the names of the white and black keys. The instructor asks the group to play for example "middle C." If all students answer the problem correctly a single sound is produced by the tone-producing device and all the keyboards in use activate their respective light on the control panel which can immediately be seen by the teacher. If however, one student plays "D" in error, the group is at once aurally aware that not all have answered correctly, and (an important psychological point) each takes steps to check his own efforts. The instructor of course will know immediately which of his students is inaccurate and in accordance with one embodiment of the invention, he will know which note was played in error. Any time it is thought wise to have the class work without the benefit of sound, this can be accomplished by means of audio-control switches within the reach of the teacher.

As in all applications of the present invention, it will be realized that every student is actively participating at all times and doing so in a practical manner. Moreover, he feels that he is competing with his fellow pupils and very imporant, is constantly under the teacher's control in respect to both accuracy and rapidity of answer given.

Some practical uses of certain aspects of the present invention include the following:

SCALE BUILDING

It is a regrettable fact that the majority of students know, for example, that the scale of G major includes the note F♯ but never achieve the *feel* of the scale or key under their hands. By systematically building all types of scales on the Multiple Student Keyboard, this can be achieved with enormous benefit to comprehension and keyboard control and poise. Scales can be played either by the group or by individual students being responsible in turn for the various component notes.

INTERVALS

From any note played by the instructor a required interval is provided by the students. To promote inner ear development, the student keyboard audio control switch can be moved to the "off" position with, of course, the control panel indicating the notes being played. On the other hand, the sustained quality of organ tone has been found to be enormously helpful in demonstrating the actual sound of musical intervals.

MUSICAL DICTATION

Individual notes or musical phrases are played by the instructor and, a tempo having been established, are repeated by the class.

MELODY BUILDING

The first phrase of a melody is played by the teacher and a second and concluding one provided by individual students. The most rewarding answer is then played by the group. Alternately, the class is offered a time outline and asked to provide notes to complete the "skeleton." The class being asked to repeat various commendable answers involves the best elements of ear training and musical dictation.

TIME

Teacher plays or writes a bar of music on the blackboard in musical notation and the class is asked to play the bar on a given note. All of the lights for that note will flash in exact ratio to the note values indicating at once any deviation from accurate playing.

SIGHT READING

Any sight reading system or exercises can be used in conjunction with this apparatus and is bound to be the more meaningful because of the group participation and the fact that error both of time and pitch can be so quickly and easily traced and corrected.

TRANSPORTATION

As a further means of broadening the grasp of keys and of keyboard technique a theme is played by the instructor and is then transposed into other keys by the class—individually or as a group. If individually, the sound of other students' keyboards can be turned off resulting in their being able to play simultaneously with the "performer," not interfering with him but still revealing to the instructor whether or not their playing is accurate.

HARMONY (a) The teacher plays either a melody or figured or unfigured bass while the student plays his suggested harmonic accompaniment.

(b) The process can be reversed.

(c) Advisable chordal progressions such as cadences can be played and analysed.

(d) Less desirable techniques (consecutive fifths and octaves, awkward movement of parts, etc.) can be equally well demonstrated.

COUNTERPOINT

Teacher plays the Canto Fermo—student plays the counterpoint or vica versa—thus the class hears the complete exercise and observes the weakness and strength of it.

LEARNING OF MUSICAL COMPOSITIONS

While in no way claiming to deal with such individual details as style and expression, the present method and apparatus does provide a means whereby particularly the junior piano student can learn the notes of a composition under guidance and in company with others of comparable grade, thereby accelerating and making more pleasurable the learning process.

GROUP PLAYING

All too few piano and organ students have the opportunity to make music collectively. The multiple keyboard system makes it possible for them to join in the playing of rounds, duets, six and eight hand arrangements, vocal scores and, in the case of more advanced pupils, scores of chamber and full orchestral works, thereby broadening immeasurably their music experience.

In the drawings that accompany this application.

Figure 1:
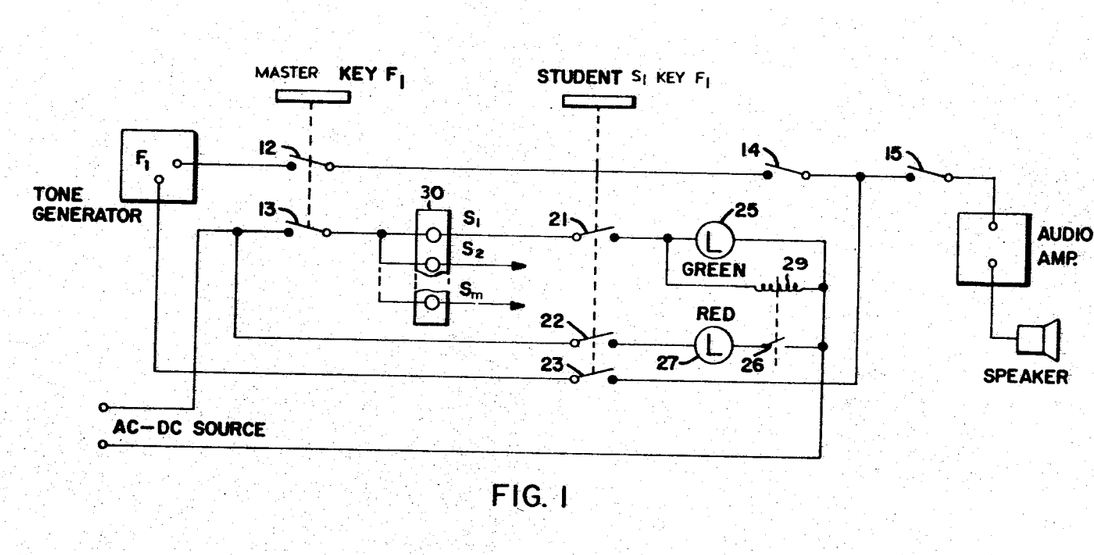
FIGURE 1 is a semi-schematic drawing showing a wiring diagram for an apparatus in accordance with one embodiment of the present invention.

Referring now to FIGURE 1, there is shown in this figure, a semi-schematic diagram for one key of the keyboard called here "Tone $F_1$." The tone generator generating tone $F_1$ is connected to the master's or teacher's key $F_1$. This key is connected to two ganged single-pull single-throw switches 12 and 13 so that when the key $F_1$ is depressed switches 12 and 13 are closed. Thus, provided that other switches in the circuit such as switch 14 and switch 15 are closed a tone will be transmitted to the audio amplifier if a tone is produced in the tone-producing device. If, at the same time, student $S_1$ depresses his key $F_1$ he closes three single-pull, single-throw switches ganged beneath that key and numbered 21, 22 and 23. Switch 23 provides a direct line for the tone $F_1$ from the tone generator to pass to the audio-amplifier and so on. This will not produce any additional tone since the teacher's key was depressed and was already sounding the same tone $F_1$, through switch 12. Switch 22 passes AC or DC current from a current source through a red light 27 mounted on the teacher's control panel and through a normally closed relay switch 26.

Switch 21 will pass the same current through a green lamp 25 indicating that the correct key has been depressed by the student only if switch 13 has been depressed by the teacher which in this example is in fact the case. However, if current passes through the green lamp some current also passes through the relay solenoid 29 which is activated to open relay switch 26 and bar the passage of current to light the red lamp.

Thus, when the teacher depresses a key, any wrong key depressed by the student will produce a red light whereas the right key being depressed by the student will produce a green light. These lights are of course visible to the teacher on the control panel. They can, if desired, be also made visible to each student. Distributor board 30 shows symbolically how the current from the teacher's key $F_1$ through switch 13 is distributed to the various student keyboards, $S_1$, $S_2$ up to $S_m$, where $m$ is the number of students.

Figure 2:
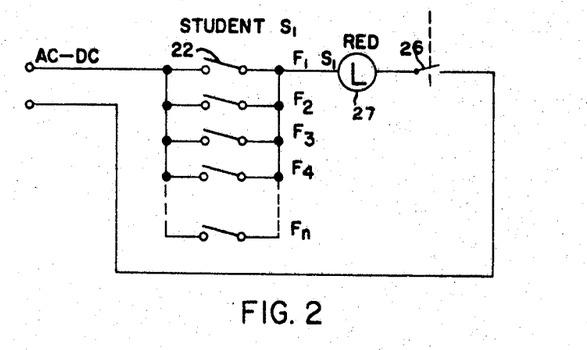
FIGURE 2 shows a clarification of the red light circuitry of FIGURE 1.

FIGURE 2 shows how the current from the AC or DC source is distributed in any one student's keyboard through all the switches 22 on the keyboard. Of course, there is one switch 22 for each key of the keyboard. This shows that depressing any key on the student keyboard will pass current through the red light. However, as brought out above, in the case where that key happens to be the correct key, the current through the green light activates the relay switch 26 in the red light circuit which opens that circuit and prevents the red light 27 from becoming illuminated.

Figure 3:
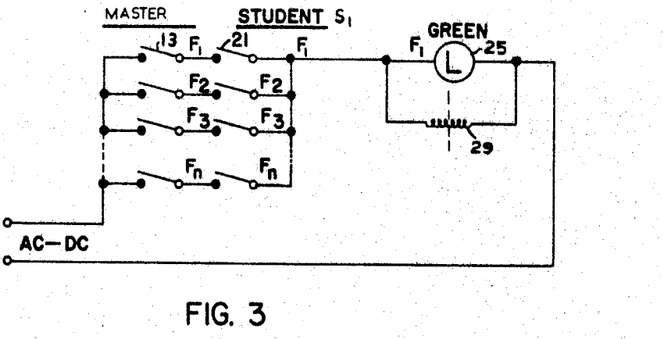
FIGURE 3 shows a clarification of the green light circuitry of FIGURE 1.

FIGURE 3 shows simply how all the switches 21 on any given student keyboard $S_1$ feed into a single circuit to activate a green lamp for that particular keyboard on the control board. Of course activation of the green lamp also activates the relay 29 to open the red light circuit.

There follows a general description of the use of the embodiment shown in FIGURES 1, 2 and 3.

The instructor uses a keyboard designated as the MASTER. The students $S_1$ to $S_m$ are each supplied with a student keyboard. The unit allows the instructor to set a musical problem and then monitor each student's answer simultaneously. The monitoring is done visually and aurally with the instructor being able to disable the aural input from any student.

When the master key $F_1$ is depressed, power is applied to key $F_1$ of each student through an individual plug and cable. If the student $S_1$ depresses key $F_1$ on his unit, the power from the master key switch 13 passes through switch 21 of key $F_1$ on the student keyboards. This power is then used to illuminate the green light 25 corresponding to that student. Since each student unit $S_1$ to $S_m$ has a corresponding light 25 on the master, the instructor is able to check at a glance which of his students have answered correctly.

If the student $S_1$ depresses say key $F_2$ instead of $F_1$, then no power is applied to the $S_1$ green light 25 since no power is being supplied to switch 21 of key $F_2$ of the student unit from key $F_2$ of the master. Depressing key $F_2$ on the $S_1$ unit also closes $S_1$ switches 22 and 23 connected to the key. When $F_2$ switch 22 on keyboard $S_1$ is closed power passes through the switch to illuminate the $S_1$ red light 27. This visually shows the student error.

The audio power passing through switch 23 on key $F_2$ of the student keyboard $S_1$ (if the toggle switch 15 on the master panel is closed) returns to the audio system 26 generating a dissonant note $F_2$ and providing an aural check that a student has made an error, which student is shown by the red light 27.

A relay coil 29 is connected to each green light circuit and is used to disable the red light 27. The relay is required because of the simultaneous operation of all three switches on each key of the student units.

Now let us suppose the master key of "middle C" is depressed and held down for a moment. This, of course, allows the 6.3 switching voltage to pass only to the corresponding "middle C" on each student board. Now, if the student closes the circuit (depress "middle C"), the switching voltage now can carry on through its busbar back to the control panel, energizing the coil 29 of the relay therein. This opens the switch 26 in the red light circuit; therefore only a green light is operated.

In summary then, it is obvious that any key depressed on the student board will show a red light, unless both master and students are all depressing the exact same keyboard note.

The cables used in this device may be connected in the following manner: using multiconductor or inter-communication cable, one length is taken from the tone generator boards down to terminal strips in the floor of the console and connected through a 50 pin plug and socket to the first student to supply the audio notes. A second cable is then connected to another group of barrier strips in the floor of the master console and taken to the first student, supplying 44 green light circuits, 6.3 v. AC for the red switches, one audio line to student busbar, return lead from red circuit busbar and the green circuit busbar return. Thus with the above system, one cable must contain 44 wires, while the other about 50, allowing a few spares for service purposes.

If desired, switches can be installed so that the instructor may cut any given student out of the audio circuit. Also, the sound played by the instructor may be heard through one set of loudspeakers and the sound being played by the students through another set of loudspeakers, although this will not normally be necessary or desirable.

In practice, the master or teacher will play a piece of music after instructing his class to do the same and the teacher will then watch the action of the red and green lights while listening for irregularities in the music emanating from the loudspeakers. The teacher can, if he so desires, stop playing and simply watch the red lights and this can give him a valuable guide to the timing of his students. Of course, no green lights will flash if the teacher is not playing.

The master can also for example press a note and ask his students what note is five notes up from that note. By disconnecting the students sound circuits and watching the green or red lights, he can quickly detect errors.

In another embodiment of the present invention, a variation on the previously described principle is involved. The control panel visible to the teacher in this embodiment will be described for use in a class of 10 students and 1 teacher. There will be eleven horizontal rows, one for each student keyboard and one for the teacher's keyboard. There will be forty-four vertical rows of lights—one row for each note on the keyboard. This means that there is a light for each key on every keyboard.

Figure 4:
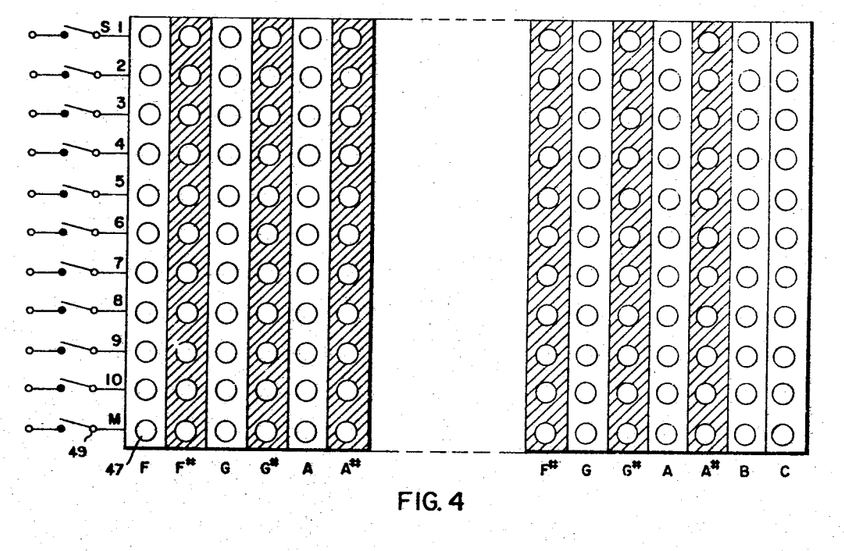
FIGURE 4 shows a control panel useable in another embodiment of the present invention.

Referring now to FIGURE 4, horizontal rows of signal rows of signal lights 1 to 10 and "M" represent the student keyboards 1 to 10 and the master keyboard which can of course be identical to the student keyboards. The vertical rows represent white and black keys F, F#, G, G#, A, A# B, C, etc.

In this embodiment, each keyboard and accordingly each horizontal row has associated therewith on the control panel an audio control toggle switch for that row and accordingly for that keyboard. The master can thus turn off or on any or all of the student keyboards, or his own, insofar as the sound production by that keyboard is concerned.

With this type of control panel, when a key is depressed on any one of the 11 keyboards, the light associated with that key will go on. If the master depresses "middle C" the respective light will go on. When he instructs his students to depress that same note, there will be an instantaneous illumination of a straight line of lights, if all are correct. If one or more is wrong, the line will be broken. If a student plays a wrong note, the instructor will know immediately who played the wrong note and what note he played.

Similarly, if a chord is played and each student plays the correct note, there will be 3 straight lines of lights. If one or more students play notes other than the chord, the instructor will know immediately who played the wrong note and, in fact, what note was played.

Figure 5:
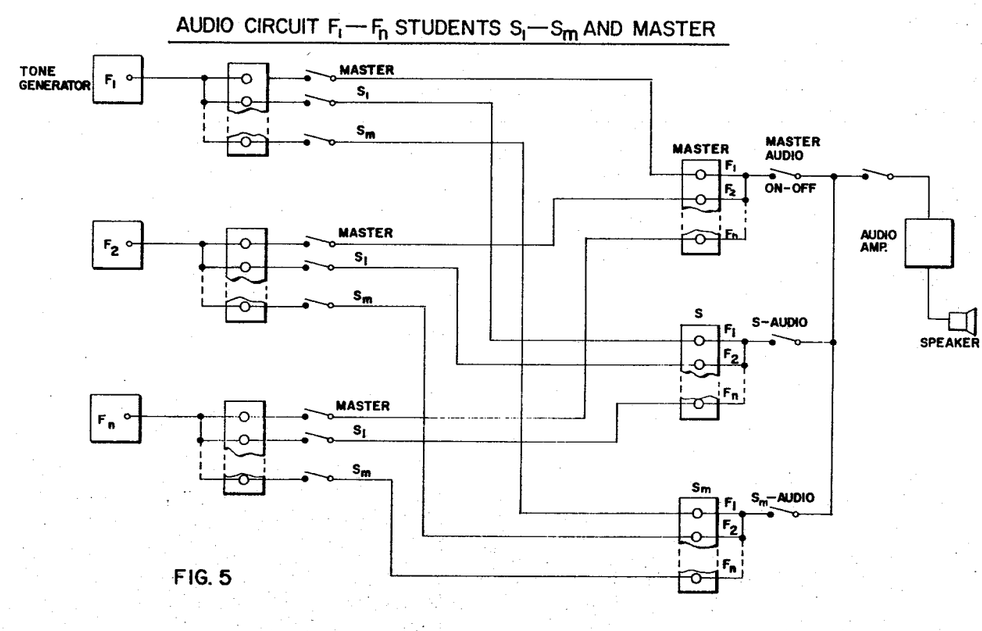
FIGURE 5 is a semi-schematic circuit diagram showing the operation of one form of the embodiment of the invention, the control panel of which is shown in FIGURE 4.

Referring now to FIGURE 5, this figure shows semi-schematically tone generators $F_1$ to $F_n$ (where $n$ is the number of keys on the keyboards), keys $F_1$ to $F_n$ on respectively the master's keyboard and student keyboards $S_1$ to $S_m$ where $m$ is the number of students, in the case of the embodiment of FIGURES 4 to 7, the number of students $m$ is 10. For example, if the master depresses note $F_1$ on his keyboard, he closes the circuit for the tone $F_2$ to pass through the circuit and to the audio-amplifier. This shows up in the control panel since in depressing the key for that tone, the master closes the switch for the audio circuit and simultaneously closes a second ganged single-pull single-throw switch closing a power circuit leading to a lamp on the control panel, which lamp is directly associated with the tone produced.

As previously brought out, in an apparatus with ten students and one master, and keyboards having forty-four keys, there will be eleven times forty-four or four hundred and eighty-four lights on the control panel.

Figure 6:
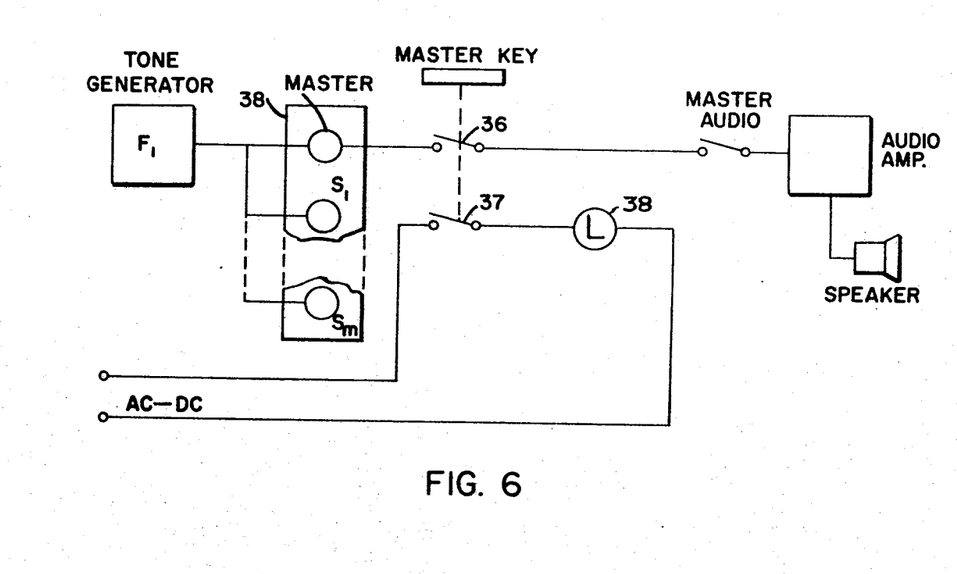
FIGURE 6 is a simplified diagram showing the tone generation. Circuitry for one tone in the embodiment is shown in FIGURES 4 and 5.

FIGURE 6 shows a complete semi-schematic circuit for the audio and visual circuits for a single key corresponding to tone $F_1$ on a typical keyboard such as the master keyboard. Tone generator $F_1$ supplies audio frequency tone to a switch 36 mounted to operate when master key $F_1$ is operated to close the audio circuit. If the master audio switch is closed at the left side of the panel shown in FIGURE 4, the audio frequency tone $F_1$ will pass through switch 36 upon depression of master key $F_1$, and into the audio amplifier to produce a tone. Depressing master key $F_1$ also depresses ganged single-pole single-throw switch 37 which permits current to pass through a lamp 38 associated with master key $F_1$ which will be one of the lights on the bottom row in FIGURE 4. At the same time that the tone $F_1$ sounds through the audio amplifier, the associated lamp will go on in the control panel.

The wiring circuit shown in FIGURE 6 is exemplary as indicated by distributor 38. The tones from tone generators $F_1$–$F_n$ are fed to keys $F_1$–$F_n$ on each of the student keyboards $S_1$ to $S_m$ in an exactly analogous manner.

The wiring diagram shown in FIGURE 6 will require a relatively large number of wires between the student keyboards and the master keyboards and the control panel. This number can be greatly reduced by employing the same wire for the audio circuit and the light power circuits.

Figure 7:
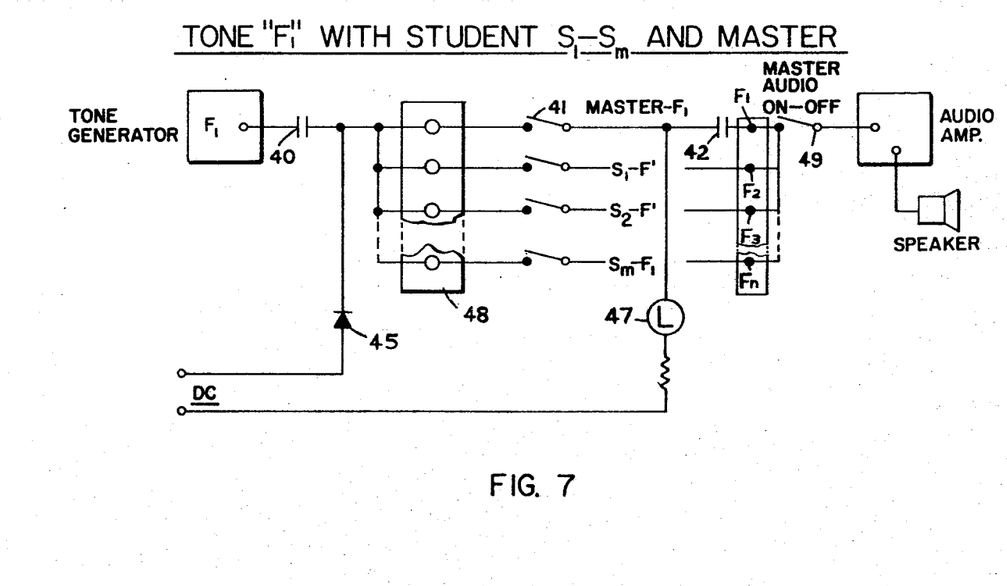
FIGURE 7 shows detail similar to FIGURE 6 in which total number of interconnecting wires is reduced by the multiple use of the wires.

Referring now to FIGURE 7, audio-frequency tone $F_1$ passes easily through a capacitor 40 and passes to the appropriate switch 41 on the master keyboard. If the master depresses key $F_1$, the audio frequency current will pass through the master $F_1$ switch 41 and pass through a second capacitor 42 to the audio-amplifier to produce a tone. This current will not enter the DC lamp circuit since the filter choke 46 presents a high impedance path to audio frequencies and effectively prevents the entry of the AC audio-frequency current into the DC circuit. The DC current passes through an audio blocking diode 45 to the same $F_1$ switch 41 on the master keyboard when the instructor depresses the key $F_1$ on his keyboard, and passes through the lamp 47 and the filter choke 46 to the DC return, lighting the lamp 47. The DC is prevented from entering the tone generator or the audio amplifier by virtue of the capacitance 40 and 42. A similar circuit is employed for tone $F_1$ for each of the $m$ students $S_1$ to $S_m$.

It will be obvious that this combined system is fully practical as long as care is taken to provide adequate capacitance between the tone generator and the DC current, an adequate filter choke in the DC circuit, and a capacitor between the DC circuit and the audio-amplifier. An audio blocking diode should also be inserted in the DC circuit to prevent the transfer of an audio-frequency from a tone generator to the output of another tone generator. It will be noted that the diode associated with any one tone generator will allow the negative portion of the audio wave form to pass through to the DC return but this negative portion of the audio wave form is then blocked at all other diodes connected to the DC return.

The "mixed" signal from the tone generator and the DC source (better described as an audio signal with a DC offset) is applied three capacitances 40 to a distribution terminal board 48. From this terminal board, wires are run, one to each keyboard and connected to the switch attached to the key corresponding to the audio frequency of the tone generator.

The audio signal passes through the low impedance capacitor 42 to a collector terminal board. Each keyboard ($S_1$ to $S_m$ and master) has a corresponding collector terminal 50 where the signal from each of the 44 keys is collected and a single output line taken off. This single output line from each keyboard is passed through an on-off toggle switch (such as switch 49) operated by the instructor. If any toggle switch 49 is open, the movement of the keys on the keyboard corresponding to that switch can be monitored by means of the indicator light corresponding to that keyboard but no audio output will be obtained from that keyboard. When the switch 49 is in the closed position, the audio output is applied to the audio amplifier and thence to the loudspeaker.

As an example of a simple lesson involving the present embodiment, a group of students meet for their first class and are shown the names of the white and black keys. The instructor asks the group to play, for example, "middle C." If all answer correctly, one sound is produced and all keyboards in use activate the respective light on the control panel and this is clearly evident by the straight vertical line of illuminated lights. If, however, the student operating keyboard #3, for instance, plays "D" in error, the group is at once aurally aware that not all have answered correctly and take steps to check their own efforts. The instructor, of course, knows immediately which of his students is inaccurate and which note was played in error. The "D" light for keyboard #3 is illuminated which produces a jog in the otherwise straight line. At any time that it is desired to have the class work without the benefit of sound, this can be accomplished by means of the audio control switches 49 indicated on the control panel.

I claim:

1. A method of assisting the teaching of music to a class of students by a tutor, comprising:
   (a) providing a piano-type keyboard for each student;
   (b) providing for each key of each keyboard a device adapted to produce a sustained musical tone commonly associated with that particular key of such a keyboard;
   (c) providing a tutor's console, including a plurality of signal lights, said signal lights being arranged in a plurality of rows and columns, each row representing a separate student keyboard and each column representing a separate key on said keyboard;
   (d) electrically interconnecting all the keyboards with that console;
   (e) instructing all students in the class to strike specified keys on their keyboards;
   (f) obtaining an immediate collective aural response from the tone producing devices of the keys struck by the students; and
   (g) displaying on the console by means of said signal lights a representation visible only to the tutor of the keys actually struck on each of the keyboards.

2. The method of claim 1, including the steps of
   (h) providing on each student keyboard a visual indicator connected to said tutor's console, and
   (i) conveying automatically to each said visual indicator an indication of the correctness of the key struck by each particular student.

3. An apparatus adapted for assisting the teaching of music to a class of students by a tutor, comprising:
   (a) a plurality of piano-type keyboards, one for each student;
   (b) tone producing means arranged to produce upon actuation of each key on each keyboard a sustained musical tone commonly associated with that particular key of such a keyboard;
   (c) a tutor's console, including a plurality of signal lights, said signal lights being arranged in a plurality of rows and columns, each row representing a separate student keyboard and each column representing a separate key on said keyboard;
   (d) electrical interconnections between on the one hand the console and on the other hand each of the keyboards; whereby the student actuation of keys on said keyboards activates corresponding ones of said console signal lights.

4. The apparatus according to claim 3, and in which:
   (a) each keyboard is provided with its own individual lamp for indicating the correctness of the keys struck on that keyboard;
   (b) the console is provided with a keyboard having keys which the tutor can actuate to indicate a proper choice of keys; and
   (c) switch means associated with the keyboard on the console control the energization of the said lamps on the students' keyboards.

5. An apparatus according to claim 3, and in which:
   (a) the keys on each students' keyboard actuate switches;
   (b) those switches are adapted to remain closed once actuated by the student; and
   (c) a switch on the tutor's console is so connected as to enable the tutor to free the switches on the students' keyboards.

6. An apparatus according to claim 4, and in which:
   (a) a first switch is associated with each key on each student's keyboard;
   (b) a second switch is ganged to operate with each first switch;
   (c) the first switch is connected to energize the corresponding lamp on the tutor's console;
   (d) each second switch on each individual switchboard has a first terminal and a second terminal;
   (e) all first terminals on a particular keyboard have a common connection to the said lamp on that keyboard;
   (f) the second terminal of each said second switch is connected to a first terminal of a corresponding correctness switch on the tutor's console; and
   (g) the second terminal of those correctness switches are connected together to a first pole of a power source a second pole of which is connected to the said lamps on the student keyboards.

References Cited

UNITED STATES PATENTS

| | | | |
|---|---|---|---|
| 1,696,901 | 1/1929 | Bostelman | 84—478 |
| 3,186,109 | 6/1965 | Brinton | 35—9 |
| 3,190,014 | 6/1965 | Rhodes | 35—9 |
| 3,199,230 | 8/1965 | Sylvester et al. | 35—9 |
| 3,300,876 | 1/1967 | Johannsen | 35—9 |
| 3,314,172 | 4/1967 | Boyett | 35—9 |
| 3,377,716 | 4/1968 | Schmoyer | 35—6 |
| 3,395,461 | 8/1968 | Krause | 35—6 |

FOREIGN PATENTS 1,173,777  7/1964  Germany.

EUGENE R. CAPOZIO, Primary Examiner

WALTER W. NIELSEN, Assistant Examiner

U.S. Cl. X.R.

84—478